United States Patent Office 3,704,199
Patented Nov. 28, 1972

3,704,199
PRODUCTION OF COATED FIBERS AND
COATING COMPOSITION
Clayton A. Smucker, Newark, Ohio, assignor to Owens-Corning Fiberglas Corporation
No Drawing. Continuation of application Ser. No. 329,250, Dec. 9, 1963, which is a continuation-in-part of application Ser. No. 23,389, Nov. 8, 1963, and a continuation-in-part of application Ser. No. 853,438, Nov. 17, 1959, all now abandoned. This application Jan. 4, 1971, Ser. No. 103,926
Int. Cl. D04h 3/12
U.S. Cl. 161—157                                3 Claims

ABSTRACT OF THE DISCLOSURE

Glass fiber thermal or acoustical insulating material and method for production thereof. Glass fibers are deposited with a binder on a conveyor and conveyed through an oven where the binder is cured. The mass of fibers and binder is compressed, if required, to provide a desired apparent density. The binder is a phenol formaldehyde condensate produced using barium hydroxide as a condensing agent; after condensation, the barium hydroxide is converted to barium sulfate particles in the size range of from 1 millimicron to 1 micron. The barium sulfate particles remain suspended in the resin, become a part of the binder composition, and are distributed throughout the binder in the final product. Their presence facilitates binder flow in the glass fiber process and improves the strength of the final product.

REFERENCE TO RELATED APPLICATIONS

This is a continuation of application Ser. No. 329,250, filed Dec. 9, 1963, now abandoned, which application was, in turn, a continuation-in-part of application Ser. No. 236,389, filed Nov. 8, 1962 and now abandoned and a continuation-in-part of application Ser. No. 853,438, filed Nov. 17, 1959, and now abandoned disclosing and claiming only subject matter, common to one of said applications Ser. No. 853,438 and Ser. No. 236,389, said application Ser. No. 236,389, in turn, disclosing and claiming only subject matter disclosed in application Ser. No. 770,616, filed Oct. 30, 1958, and now abandoned.

This invention relates to the production of coated fibers, and to a coating composition. More specifically, the invention relates to the production of vitreous fibers coated with a hardened, infusible, phenolic material, and to an aqueous dispersion of a resole for use in producing such coated fibers.

The production of glass and other vitreous fibers for use as thermal insulating materials, acoustical insulating materials, filter media, textile filaments and reinforcement, usually for synthetic resinous materials, is a major industry. In most cases, a vitreous fiber article, for whatever use, is associated with or at least partially coated with a resinous material of some sort, most often a synthetic resinous material. In particular, thermal and acoustical insulating materials of this sort, as well as filter media, usually comprise a mass of intermeshed vitreous fibers, which fibers are at least partially coated with a hardened phenolic material, and which material is in an infusible condition, and bonds individual fibers in the mass to one another at points of contact. Such articles can be produced by projecting vitreous fibers, usually immediately after formation, through a compressible fluid, associating a hardenable phenolic binder, usually an aqueous dispersion of a resole, with the fibers being projected through the compressible fluid, collecting projected fibers and associated binder on a foraminous conveyor, and converting the binder to a hardened condition, usually in a suitable oven. When a low density, wool-like product (e.g., glass wool, or the like) is desired, a relatively low proportion of the hardenable phenolic or other binder is used, and the mass of intermeshed vitreous fibers collected on the foraminous conveyor is merely moved through a curing oven. When a higher density article is desired, a relatively larger proportion of the binder is ordinarily employed, and the mass of intermeshed fibers is subjected to a compression during the curing stage in order to accomplish densification; when cured, the phenolic or other binder supports individual fibers in the mass in the positions which they assumed, relative to one another, when the mass was compressed, so that the final article is a board-like product having an apparent density which can be varied within relatively broad limits, for example from about 4 lbs. per cubic foot to about 12 lbs. per cubic foot, by appropriate variations in relative proportion of binder used and pressure employed to accomplish compression during curing.

Resoles whether made for bonding glass fibers together or whether made for other uses are formed using an alkali as a catalyst. The alkaline catalysts must be neutralized with suitable acids after the resoles are formed to prevent the resoles from advancing to their final resite or infusible stage. Upon the neutralization of the alkaline catalyst, salts are formed in situ. Conventionally the resoles which have been produced for bonding glass fibers together have used solutions of strong alkalies such as sodium hydroxide, or potassium hydroxide, and frequently the salts which have been formed, have been water soluble salts. Such salts, however, have been found to cause deterioration of the glass fibers, particularly during prolonged exposure to humid conditions, and further have been found to cause some reduction in the strength of the resin binder itself. The prior art, therefore, as evidenced by Pat. 2,758,101 has recognized that it was desirable to remove the salts of neutralization in order to have a resole suitable for bonding glass fibers together.

According to the present invention a combination of an alkaline catalyst and a neutralizing acid which form a salt that does not attack the glass fibers has been found, and so can be left in the resole, but it has further been found that the resole with the particular salt formed in situ has further unexpected advantages as a binder for glass fibers. The improved binder for glass fibers not only flows around the fibers better than binders used heretofore, but is also stronger and less volatile, and has higher strength under humid conditions.

The instant invention also provides an improved aqueous resole dispersion for use in producing at least partially coated vitreous fibers. In a specific instance, such improved resole dispersion can be produced by condensing phenol with formaldehyde to a desired extent, in the presence of barium hydroxide, neutralizing the barium hydroxide and producing barium sulfate by adding sulfuric acid, diluting the resulting aqueous dispersion of a resole and finely divided, suspended barium sulfate particles with water to a desired percent solids, and adding any other desired binder constituents. When such a binder composition is associated with vitreous fibers which are being projected through a compressible fluid, and a mass of the fibers and associated binder is collected on a foraminous conveyor and converted to a wool- or board-product as described above, it is found that less of the binder composition is required to provide a given strength in the finished article, by comparison with previously known binder compositions. It is also found that the binder composition flows more effectively, prior to cure, on the vitreous fiber surfaces, by comparison with previously known binder compositions, and has considerably less tendency to cure prematurely, for example in a forming hood that usually surrounds the zone in which the binder composition is associated with the vitreous fibers. Finally, the resole can be used at a higher cone efficiency [1] than other previously known resole binders.

It is, therefore, an object of the invention to provide an improved binder composition which is an aqueous dispersion comprising a resole.

It is a further object of the invention to provide an improved method for producing a vitreous fiber coated with a hardened, infusible, phenolic material produced by curing a resole.

It is another object of the invention to provide an improved article which includes a vitreous fiber coated with a hardened, infusible, phenolic material.

Other objects and advantages will be apparent from the description which follows, which is intended only to illustrate and disclose, and in no way to limit, the invention.

According to the invention, an improved method for producing a phenolic-coated fiber is provided. Such method comprises the steps of establishing a body of a composition that is an aqueous dispersion of a resole and a water-soluble barium compound, adding to the composition at least one material which is reactive with the barium compound to produce barium sulfate, and in amount sufficient for substantially complete reaction, applying a coating of the resulting dispersion to a vitreous fiber, and heating at least the coating to convert it to an infusible condition with substantially all of the barium from the barium compound distributed therein as finely divided barium sulfate. It is preferred that the aqueous dispersion include from about 1 percent to about 10 percent of the barium sulfate, and that the infusible coating contain from about 4 percent to about 15 percent thereof.

As has been indicated above, a first step in the method according to the invention involves establishing a body of a composition that is an aqueous dispersion of a resole and a water-soluble barium compound. The identity of the phenol and the aldehyde that are reacted to produce the resole is of only incidental importance, since the improvements realized in accordance with the invention are attributable to physical phenomena. Accordingly, the resole can be a partial condensation product of any suitable phenol with any suitable aldehyde (for a discussion of resoles, see Martin, The Chemistry of Phenolic Resins, John Wiley & Sons, Inc., New York, 1956, particularly pages 87 through 98, and cited references). As a practical matter, however, a resole curable to an infusible resite is usually preferred for use in connection with vitreous fibers, so that at least a significant amount of a trifunctional phenol, usually hydroxy benzene for economic reasons, is preferably employed, and formaldehyde, for economic reasons and because of the greater simplicity of its chemical reactions with a phenol, is the preferred aldehyde. Most desirably, the resole is produced by reaction of formaldehyde with phenol (hydroxy benzene), and usually in proportions of from 1 mol to 3 mols, preferably, when used as a binder, of from about 1¾ mols to about 2¾ mols, and most desirably of from 2 mols to 2.5 mols of formaldehyde per mol of phenol.

It is well known that a resole is produced from a phenol and an aldehyde by reaction in an aqueous system in the presence of a basic catalyst. A resole for use in accordance with the invention can be produced with any of the basic catalysts ordinarily employed, for example alkali metal hydroxides or carbonates, or amomnium hydroxide, but barium hydroxide itself is an efficient catalyst for the condensation of a phenol with an aldehyde, and is preferably employed so that the reaction mixture which results from the condensation constitutes the aqueous dispersion of a resole and a water-soluble barium compound. Using barium hydroxide as the condensation catalyst not only avoids the necessity for using a different alkaline catalyst and then adding a soluble barium compound to the resole dispersion, but also has the incidental advantage of providing a binder composition which is substantially completely free of soluble ash. [2] From 4 percent to 12 percent of barium hydroxide, based upon the total weight of the phenol, is preferably used as the alkaline condensation catalyst, most desirably from 6 percent to 10 percent.

The terms "percent" and "parts" are used herein, and in the appended claims, to refer to percent and parts by weight, unless otherwise indicated.

Available resoles, however, can be used to establish the body of a composition that is an aqueous dispersion of a resole and a water-soluble barium compound. If, for whatever reason, soluble ash is not objectionable, a soluble barium compound can be added to any available resole, preferably in an amount such that about a 0.1 normal to a 3 normal solution relative to barium ions is provided. If it is desired to use a particular available resole, and if that resole contains soluble ash which is undesirable, the resole can be treated with a suitably regenerated cation exchange material (for example, an acid-regenerated cation exchange resin of the sulfonated styrene-divinylbenzene copolymer type), and, if desired, also with a suitable anion exchange resin, to produce a resole which is free of both cations and anions to any desired extent. The required resole is then provided merely by adding a water-soluble barium compound to the deionized resole dispersion, and preferably in an amount within the limits set forth above.

In view of the foregoing discussion, it will be appreciated that barium hydroxide is a preferred water-soluble barium compound for use according to the invention, because it is capable of acting not only as the soluble barium compound, but also of catalyzing the alkaline condensation of the phenol with the aldehyde. However, when a different alkaline condensation catalyst is used in the preparation of the resole, any other soluble barium compound can be employed. If, for some reason, it is desired to use a particular soluble barium compound which introduces undesired anions into a resole composition, such anions can be subsequently be removed from the composition, for example by treatment thereof with an appromiately regenerated anion exchange resin.

As is indicated above, at least one material which is reactive with the barium compound to produce barium sulfate is added to the aqueous dispersion of the resole and the water soluble barium compound as one step in the production of coated fibers according to the invention. Sulfuric acid can be used for this purpose, in which case finely divided barium sulfate is precipitated almost immediately, and the pH of the dispersion is lowered. The amount of sulfuric acid, when used alone, should be sufficient for substantially complete reaction with the

---

[1] The cone efficiency of a particular resole is determined by a standard test which involves determining the percentage of resin solids in a given binder volatilized during cure of a sample of that resin at 400° F. Cone efficiency is 100 minus the percent of resin solids volatilized during such cure. A high cone efficiency means a high percentage of the resin solids in a particular binder are converted to a desired cured, infusible condition. This is an important characteristic of binder compositions for use in producing vitreous fiber articles, particularly for the wool- and board-type, because fire hazard within curing ovens and air pollution by phenolic fumes are reduced by using a binder having a higher cone efficiency.

[2] The soluble ash content of a phenolic resin, usually reported in percent, is determined by burning a weighed sample thereof; weighing the total ash or residue which remains; washing the ash or residue with water to separate any water-soluble constituents therefrom; drying the ash or residue which remains; and determining the weight of the insoluble ash or residue. The difference between the weight of the total ash or residue and the weight of the water-insoluble ash or residue is considered to be the "soluble ash" content of the particular sample. The soluble ash in a phenolic resin is composed essentially of salts which remain therein after neutralization of a basic catalyst with an appropriate acid. Such salts constitute a particularly undesirable constituent in phenolic binders for use with vitreous fibers because they have a deleterious effect upon the durability, or useful life of such products.

barium ions, and, also, to lower the pH of the dispersion to one desired for final cure of the resole to an infusible resite. When the resole is to be used as a binder, or to produce at least a partial coating on vitreous fibers, it is preferred that the resole composition, as applied to the fibers, be essentially neutral, e.g., at a pH from about 6 to about 8, preferably from about 6.5 to about 7.5, and most desirably essentially 7. However, either a lower or a higher pH may be desired when such a resole composition is to be used in a different application. For example, when a foamed or cellular material is to be prdouced from a resole, a relatively low pH, usually in the range from about 2 to about 4 is preferred to facilitate cure, and in other cases, where high temperature, pressure, or both, or even a prolonged, low temperature cure can be used, a relatively high pH is suitable.

When a resole composition having a relatively high pH is desired, ammonium sulfate can be added to an aqueous dispersion of the resole and a soluble barium compound, preferably barium hydroxide, to form the desired barium sulfate and ammonium hydroxide, or an even higher pH can be achieved by using sodium hydroxide in place of the ammonium hydroxide, but the composition which results is relatively less satisfactory for use on vitreous fibers. A dispersion of any desired low pH can be produced by adding ammonium sulfate, or other sulfate salt or sulfuric acid in an amount sufficient for substantially complete reaction with the soluble barium compound, and, in addition, a sufficient quantity of sulfuric or other acid to lower the pH of the dispersion to the desired extent.

It has been found that the particle size of the dispersed barium sulfate in a resole-containing composition is important, but not the identity thereof. For example, such a composition containing finely divided, dispersed barium sulfate has essentially the same properties as a similar composition containing finely divided, dispersed silica flour. However, such a composition containing relatively coarse barium sulfate particles or relatively coarse silica particles does not exhibit the unexpected characteristic of higher cone efficiency, greater product strength for a given resin content or less tendency toward premature cure. Likewise, these unexpected results are not achieved when a barium compound is present in solution in a resole dispersion. It follows that the particle size of the insoluble barium sulfate or other insoluble material must be such that it forms a sol, or is colloidal in nature, and, therefore, that it ranges in particle size from about 1 millimicron to about 1 micron (see Lewis, Squires and Broughton, the Industrial Chemistry of Colloidal and Amorphous Materials, The MacMillan Company, New York, 1943, page 113, specifically, and pages 96–139, in general). It is known that the production of sols can be accomplished by mechanical comminution, usually between shear plates, of an insoluble material, e.g., silica flour can be comminuted in such manner, and dispersion of the finely comminuted solid in a suitable solvent or solvent system. However, mechanical comminution is an extremely laborious technique for producing insoluble material in the required plastic size range of from about 1 millimicron to about 1 micron. A far simpler, and, therefore, preferable, way to accomplish this result is by precipitation from a highly super saturated solution. This latter technique is admirably suited for the production of a barium sulfate sol in an aqueous resole dispersion. Barium hydroxide, or another soluble barium salt, can be dissolved in the aqueous phase of a resole dispersion so that the water therein is of the order of about 1 normal with respect to dissolved barium. The addition of sulfate ions, in an equivalent amount, to the resulting dispersion causes an instantaneous super saturation, with respect to barium sulfate, of the order of about 25,000 times, with the result that barium sulfate is precipitated, and the particle size of the precipitate is within the above-set forth range so that a stable sol is produced. Such result can be achieved when the aqueous phase of the resole dispersion is from about 0.1 to about 3 normal with respect to dissolved barium ions by addition of an equivalent amount of sulfate ions. An aqueous resole dispersion containing dissolved barium ions in an appropriate concentration can be produced easily by using barium hydroxide as the catalyst for the condensation of phenol with formaldehyde, so that such procedure, and the precipitation of barium sulfate from the dispersion which is produced, constitutes an ideal way to form the required sol, not only because of the advantages of high cone efficiency, more effective use of the binder composition (greater product strength for a given percentages of resin), and avoidance of premature curing, but also because the necessary sol is formed in an extremely simple manner, and because the resite which is ultimately formed is substantially completely free of soluble ash.

It has also been discovered that all of the advantages set forth above can be achieved by converting only a part of the dissolved barium compound in an aqueous alkaline resole dispersion to barium sulfate, and converting the remaining soluble barium compound to barium sulfate during final cure of the resole to a resite. Such a result can be achieved by adding a mixture of sulfuric acid and benzene sulfonic acid to the aqueous dispersion of the resole and the dissolved barium compound. The sulfuric acid reacts immediately with the barium compound to produce barium sulfate which precipitates as a sol, while the benzene sulfonic acid forms a water-soluble barium salt. During cure of the resole to a resite, however, the water-soluble barium salt is decomposed, the decomposition involving the formation of barium sulfate therefrom. Such a procedure is advantageous in certain instances. For example, it may be desired to use a particular resole composition containing a large amount of a dissolved barium compound. A sol produced by converting all of the barium compound to the sulfate may have such a high solids content that handling would be difficult in available equipment. In such case, a mixture of benzene sulfonic acid, or other sulfonic acid, and sulfuric acid, or another soluble sulfate, can be added to the aqueous, resole dispersion in an amount sufficient for substantially complete reaction with the dissolved barium to produce a mixture of insoluble barium sulfate and a soluble barium sulfonate or sulfonates. In such case, the proportion of sulfuric acid or equivalent should be sufficient that the resole composition does not cure prematurely, and has a high cone efficiency, and the amount of the sulfonic acid should be sufficient for substantially complete reaction with unprecipitated barium ions, so that the cured resite which is ultimately produced is substantially completely free of water-soluble barium compounds. As a practical matter, it is usually preferred to add to the aqueous resole dispersion a quantity of sulfate ions sufficient for reaction with at least 50 percent of the soluble barium compound, and a quantity of a sulfonic acid sufficient to convert the remaining unprecipitated barium ions to barium sulfate. When used, the sulfonic acid is ordinarily employed to an extent sufficient for reaction with at least about 10 percent of the soluble barium compound.

The following examples are presented solely for the purpose of further illustrating and disclosing the invention, and are in no way to be construed as limitations thereon. The examples constitute the best presently known modes for practicing the invention.

EXAMPLE 1

A 25 gallon reaction vessel was charged with 94 lbs. of phenol, 202 lbs. of 37 percent formalin and 10 lbs. of barium hydroxide ($Ba(OH)_2$), and the resulting charge was heated for a total of 13 hours during which time it was stirred by a propeller-type agitator. The charge was heated to 110° F., and maintained at about such temperature for approximately 3 hours, heated to and held at approximately 125° F. for an additional 4 hours, and then heated to and held at about 140° F. for the remaining 6 hours. The reaction products which were produced constituted an aqueous alkaline dispersion of a resole, and had a solids content of 45.92 percent, a pH of 8.65 and a free formaldehyde content, based upon total resin solids, of 6.5 percent. A 19 pound portion of 30 percent sulfuric acid was then added to the resole to lower the pH thereof to 7, and to precipitate barium sulfate.

A mixing tank provided with a propeller-type agitator was charged with 11 gallons of water, and the water and subsequently charged ingredients were stirred during the formulation of a binder composition from the resole dispersion produced as described in the preceding paragraph. A 7 gallon portion of the resole dispersion was then added, followed by a 2.1 gallon portion of a pine wood pitch extract,[3] 1 quart of 28 percent ammonium hydroxide, ⅓ gallon of mineral oil emulsified with stearic acid and ammonium carbonate and 2½ ounces of ammonium sulfate dissolved in 5 ounces of water. Agitation was continued for 5 minutes after the ammonium sulfate addition to assure substantial uniformity of the completed binder composition.

The binder composition produced as described in the preceding paragraph was sprayed into a forming hood through which glass fibers were being projected onto a foraminous conveyor. The fibers were collected in the form of a wool-like mass associated with the binder composition. The relative proportions of binder composition and fibers were such that the binder, after cure thereof, constituted slightly in excess of 8 percent of the total wool-like mass. Cure was accomplished in an oven maintained at a temperature of about 400° F. through which the glass fibers and associated binder were passed in a period of about 5 minutes, and within which the mass was compressed sufficiently that a board-like product was produced, which board-like product had an apparent density of about 11½ lbs. per cubic foot, on the average. The board-like product had a modulus of elasticity of 8,667 lbs. per square foot as produced, and a modulus of elasticity of 7,231 lbs. per square foot after having been submitted to a standard weather test in a constant temperature, constant humidity room maintained at 50° C. and 100 percent relative humidity for a period of two weeks. This amounted to a loss in modulus of elasticity of only 16.6 percent after the test, while a similar board-like product which had been produced from a similar binder composition including a conventional resole dispersion lost 32.6 percent in modulus of elasticity after such test.

EXAMPLE 2

The procedure described in the first paragraph of Example 1 has also been carried out to produce different resole compositions. The proportions of phenol, formaldehyde, and barium hydroxide, and the reaction conditions used are presented in Table I, below, for representative resoles.

TABLE I

| Resole Sample No. | Parts of— | | | Charge heated | | | | Parts of 30 percent sulfuric acid solution |
|---|---|---|---|---|---|---|---|---|
| | Phenol | Formalin [1] | Barium hydroxide | Hours | At, °F. | Hours | At, °F. | |
| 2 | 94 | 176 | 8.1 | 16 | 120 | 3 | 140 | 19 |
| 3 | 94 | 162 | 8.1 | 16 | 120 | | | 19 |

[1] 37 percent water solution of formaldehyde.

Binder compositions have been prepared from the resoles identified in Table I, above, by the procedure described in the second paragraph of Example 1, and have been used with glass fibers as described in the third paragraph of Example 1. In all cases, the binder compositions were superior to such compositions prepared from conventional resoles with respect to tendency to cure prematurely; ability to flow on the fibers; strength of final product; and durability of final product. Representative binder formulations are presented in parts by weight in Table II, below:

TABLE II

| Sample Number | Parts of resole | Water | Pine wood pitch extract [1] | Mineral oil emulsion | 28% ammonium hydroxide | Sulfate | |
|---|---|---|---|---|---|---|---|
| | | | | | | Identity | Parts |
| 2 | 67.6 | 91.5 | 18.6 | 2.5 | 2.0 | (NH₄)₂SO₄ | 0.15 |
|   | 67.6 | 91.5 | 18.6 | 2.5 | 2.0 | H₂SO₄ | 0.12 |
| 3 | 67.6 | 91.5 | 18.6 | 2.5 | 2.0 | (NH₄)₂SO₄ | 0.15 |
|   | 67.6 | 91.5 | 18.6 | 2.5 | 2.0 | H₂SO₄ | 0.12 |

[1] Identified in Example 1, above.

The pine wood pitch extract and the mineral oil emulsion used in the identified binder compositions are employed principally as extenders. Their use is important economically, but an equivalent or slightly superior result can be achieved by replacing both with an equal quantity of the resole in the binder formulations presented herein.

A further advantage of the resin produced as described in the first paragraph of Example 1 has also been demonstrated by mixing 20 parts of the resole with 0.2 part of ammonium sulfate and 580 parts of soda lime glass beads, and placing the resulting composition against a pattern heated to a temperature of about 450° F. Portions of the resole glass bead admixture adhered to the

---

[3] The extract used is resinous in nature and had the following analysis: 6 percent high melting furfural condensate (methanol insoluble); 4 percent neutral oils (hydrocarbons, esters and ethers); 9 percent resin; 5 percent belro-phenol-lactone (probably $C_{18}H_{14}O_{3.2}$ ($CH_3OH$); 5 percent flavone type polyphenol (possibly about $C_{15}H_7O_{2.3}OH$); 2 percent fumic acid type compound; 0.2 percent pectic acid type compound; 6 percent air oxidized resin acid (unfused); 3 percent strongly acidic compound, 38 percent weakly acidic, high melting phenolic compound; 19 percent relatively neutral phenol ethers and esters; 1 percent water soluble carbohydrates, etc.

heated pattern, and, after about a 7 minute cure, constituted a shell mold. The shell mold was found to have a tensile strength of approximately 750 lbs. per square inch, as prepared, and a tensile strength of about 250 lbs. per square inch after having been subjected for 15 hours to an atmosphere of 100 percent relative humidity at a temperature of 50° C. A similar sample, except that a 0.23 part portion of sulfuric acid was substituted for the ammonium sulfate had essentially the same dry strength of about 750 lbs. per square inch, but a significantly higher strength of about 500 lbs. per square inch after having been subjected to a constant 100 percent relative humidity atmosphere at a temperature of 50° C., while a third sample prepared from a commercially available resole composition had a strength, as prepared, of only about 575 lbs. per square inch after having been subjected to the 100 percent relative humidity atmosphere t 50° C. for 17 hours. This test demonstrates that sulfuric acid is significantly superior to ammonium sulfate for use in producing barium sulfate from barium hydroxide in a resole composition according to the invention. It will be appreciated that the reason for such superiority is that sulfuric acid produces water as a by-product of its reaction with barium hydroxide, while ammonium sulfate produces ammonium hydroxide as a by-product. Sulfuric acid and sulfonic acids, therefore, are preferably used to produce barium sulfate, and, most desirably, by reaction with barium hydroxide.

The invention provides a means of forming a resole type phenolic resin by a suitable catalyst which, when thereafter cured upon the fiber without steps toward removal of the catalyst, gives a cured resin fiber composition free of soluble aqueous salts. Thus, a resin is formed with a water soluble barium catalyst and in the final product such material is found as water insoluble barium sulfate. This is generally desirable since water soluble salts in cured phenolic resin coated fiber products generally give products of poorer durability and greater susceptibility to corrosion. Removal of catalyst from a resin still in the water soluble stage, either as such or as salts by filtration, by ion-exchange, or other means has represented an additional processing step which may now be avoided. On the other hand, where processing or other reasons make it desirable, soluble ash resins may be admixed with the special resins formed as described or a resin formed directly with mixed catalysts including a water soluble barium compound. These may be formed and fibers then coated and cured with such.

To further demonstrate the advantages of the improved binder composition, the following comparison was made:

Batches of a conventional phenol formaldehyde resole, hereafter termed Resole A, are made by condensing formaldehyde with phenol in a mol ratio of substantially 2.3:1 in the presence of sodium hydroxide. The resoles produced are neutralized with sulfuric acid and de-ionized by flowing through a column packed with a cation exchange material in the ammonium cycle. Batches of this resole have a stroke cure ranging between 155 and 170 seconds, a cone efficiency of 70 percent, a dry strength, as outlined see column 9, lines 9–10 hereof, ranging between 775 and 825, and a wet strength, as outlined see column 9, lines 10–11, ranging between 700 and 750.

Batches of a conventional phenol formaldehyde resole hereafter termed Resole B, are made by condensing formaldehyde with phenol in a mol ratio of substantially 2.3:1 in the presence of sodium hydroxide. The resoles produced are neutralized with sulfuric acid to a pH of 7 leaving the sodium sulfate salt in the resoles. Batches of this resole have a stroke cure ranging between 125 and 140 seconds, a cone efficiency of 70%, a dry strength ranging between 750 and 800, and a wet strength ranging between 500 and 550.

Batches of a phenol formaldehyde resole produced according to the present invention and hereafter referred to as Resole C are made by condensing formaldehyde with phenol in a mol ratio of substantially 2.45:1 in the presence of approximately 1 normal barium hydroxide. The resoles produced are thereafter neutralized to a pH of 7 using sulfuric acid, and the resulting barium sulfate salt is left in situ. Batches of this resole have a stroke cure ranging between 160 and 200 seconds, a cone efficiency of 70%, a dry strength ranging between 825 and 875, and a wet strength ranging between 750 and 800.

In general, it is a property of phenol formaldehyde resoles that the stroke cure increases with a decrease in the molar ratio of formaldehyde to phenol ratio, and that the cone efficiency and strength increases with an increase in the formaldehyde to phenol ratio. It is surprising, therefore, that the stroke cure of Resole C should be higher than Resole A and B, even though the formaldehyde to phenol ratio of Resole C is greater than that of Resole A and B. In addition, Resole C can be cured at higher temperatures than can Resoles A and B without reducing its cone efficiency below 70%. The properties of glass fiber materials bonded together using Resole C as against the properties of glass fiber materials bonded together by Resoles A and B is even more striking than the properties of the resoles themselves, since Resole C flows around the fibers better and can be cured at higher temperatures than can Resoles A and B to provide a cumulative advantage.

The improvement which is obtained by reason of the finely divided barium sulfate disbursed throughout the resole can be had regardless of the type of phenol or aldehyde which is used, and regardless of other additives such as those which enhance the punk resistance of the binder. Melamine, dicyandiamide, urea, and other amino resin formers, when reacted with a resole of the present invention improve its punk resistance.

EXAMPLE 3

Phenol-melamine-formaldehyde condensation products according to the invention were produced by the following procedure:

A reaction vessel was charged with 58 parts of phenol, 123.4 parts of formalin,[4] and 12 parts of barium hydrate $(Ba(OH)_2 \cdot 8H_2O)$, and the resulting charge was heated for a total of ten hours during which time it was stirred by a propeller-type agitator. The charge first was heated to 110° F., and maintained at about such temperature for approximately three hours, heated to and held at approximately 120° F. for an additional five hours, and then heated to and held at about 140° F. for the remaining two hours, at which time the refractive index of the reaction mixture was 1.4620, and infra-red absorption analysis indicated that it was substantially free of unreacted phenol and also of methylene groups. The reaction products were then cooled to approximately 100° F., and neutralized with sulfuric acid to a pH of about 7.5. A 23.2 part charge of melamine was then added to the neutralized reaction products, and the resulting mixture was heated to and maintained at approximately 140° F. for an additional two hour period. The reaction products were then cooled to approximately room temperature of 75° F., and neutralized with further sulfuric acid to a pH of approximately 7.2. Before the first neutralization (of the phenol-formaldehyde partial condensation products, with sulfuric acid, and to a pH of about 7.5), the reaction mixture was found to have a free formaldehyde content of approximately 3.6 percent. After addition of melamine thereto, further reaction, and the final neutralization, the reaction products had a free formaldehyde content of approximately ½ percent. Substantially all of the barium hydroxide condensation catalyst was precipitated as barium sulfate, and the final product

---

[4] Formalin is a 37.2 percent solution of formaldehyde in water.

was substantially free of soluble ions, and had a dilutability[5] of 700.

A binder composition was then prepared from a portion of the phenol-melamine-formaldehyde partial condensation products. The binder composition was prepared in a mixing tank provided with a propeller-type agitator, which tank was first charged with 11 gallons of water, and the water and subsequently charged ingredients were stirred during the formulation of the binder composition. A 7 gallon portion of the phenol-melamine-formaldehyde dispersion produced as described in the preceding paragraph was then added, followed by a 2.1 gallon portion of a pinewood pitch extract[6], 1 quart of 28 percent ammonium hydroxide, ⅓ gallon of mineral oil emulsified with stearic acid and ammonium caseinate, and 2½ ounces of ammonium sulfate dissolved in 5 ounces of water. Agitation was continued for five minutes after the ammonium sulfate addition to assure substantial uniformity of the completed binder composition.

The binder composition produced as described in the preceding paragraph was sprayed into a forming hood through which glass fibers were being projected onto a foraminous conveyor. The fibers were collected in the form of a wool-like mass associated with the binder composition. The relative proportions of binder composition and fibers were such that the binder, after cure thereof, constituted slightly in excess of 8 percent of the total wool-like mass. Cure was accomplished in an oven maintained at a temperature of about 400° F. through which the glass fibers and associated binder were passed in a period of about 5 minutes, and within which the mass was compressed sufficiently that a board-like product having an apparent density of about 11½ lbs. per cubic foot, on the average, was produced, The board-like product passed a standard Fire Underwriter Laboratory test for a fire resistant ceiling tile, while a similar board-like product produced in an identical way, but from a binder composition made from phenol-formaldehyde partial condensation products[7] failed to pass such tests.

A "Shell Mold Test" (see column 9, lines 9–11) was also used to evaluate the strength properties of the phenol-melamine-formaldehyde resole produced as described above. Shell molds produced, after cooling to room temperature of about 75° F. under ambient conditions had an average tensile strength of substantially 750 lbs. per square inch,[8] while other shell molds, after having been subjected to a temperature of 50° C. in an atmosphere of 100 percent relative humidity for a period of fifteen hours, had an average tensile strength of substantially 410 lbs. per square inch.

---

[5] The dilutability of condensation products is 100 times the number of volumes of water added to one volume of the products at 60 percent solids to form a cloud at a pH of 7.1 to 7.3.

[6] The extract used is resinous in nature and can be isolated as described in U.S. Pat. 2,391,368 (page 2, column 1, lines 34 and following). It had the following analysis: 6 percent high melting furfural condensate (methanol insoluble) ; 4 percent neutral oils (hydrocarbons, esters and ethers) ; 9 percent rosin ; 5 percent bolro-phenol-lactone (probably $C_{18}H_{14}O_{3.2}$ (OCH$_3$OH)) ; 5 percent flavone type polyphenol (possibly about $C_{15}H_7O_{2.2}OH$) ; 2 percent fumic acid type compound ; 0.2 percent pectic acid type compound ; 6 percent air oxidized resin acid (unfused) ; 3 percent strongly acidic compound ; 38 percent weakly acidic, high melting phenolic compond ; 19 percent relatively neutral phenol ethers and esters ; 1 percent water soluble carbohydrates, etc.

[7] The phenol-formaldehyde partial condensation products were produced from 180 parts of formalin, or 37 percent water solution of formaldehyde, 100 parts of phenol and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The sodium hydroxide in the reaction mixture was then neutralized with phosphoric acid, and the neutralized resin was filtered.

[8] It has been found that the actual strength found on shell mold tests performed using different batches of the identified and other resoles may vary by as much as about 20 percent from the actual figure reported ; the value selected for presentation herein, in every case, has been found, on the basis of extensive testing, to be typical.

The "Combustibility Index"[9] of the phenol-melamine-formaldehyde resole produced as described above was found to be 9.

EXAMPLE 4

Phenol - melamine-urea - formaldehyde condensation products according to the invention were produced by the following procedure which constitutes the best presently known mode for practicing the invention:

A reaction vessel was charged with 58 parts of phenol, 123.4 parts of Formalin, and 12 parts of barium hydrate ($Ba(OH)_2 \cdot 8H_2O$), and the resulting charge was heated for a total of ten hours during which time it was stirred by a propeller-type agitator. The charge first was heated to 110° F., and maintained at about such temperature for approximately three hours, heated to and held at approximately 120° F. for an additional five hours, and then heated to and held at about 140° F. for the remaining two hours, at which time the refractive index of the reaction mixture was 1.4620, and infra-red absorption analysis indicated that it was substantially free of unreacted phenol and also of methylene groups. A 17.4 part charge of melamine, a 3.3 part charge of urea and a 2.5 part charge of urea sulfate, calculated as urea, were then added to the reaction products, and the resulting mixture was heated to and maintained at approximtaely 140° F. for an additional two hour period. The reaction products were then cooled to approximately room temperature of 75° F., and neutralized with sulfuric acid to a pH of approximately 7.2. Before the addition of the melamine, urea and urea sulfate, the reaction mixture was found to have a free formaldehyde content of approximately 3.6 percent. After addition of the melamine, urea and urea sulfate thereto, further reaction, and the final neutralization, the reaction products had a free formaldehyde content of approximately ½ percent. Substantially all of the barium hydroxide condensation catalyst was precipitated as barium sulfate, and the final product was substantially free of soluble ions, and had a dilutability of 725. The Combustibility Index of the phenol-melamine-urea-formaldehyde resole was found to be 9. Shell molds produced in connection with the Shell Mold Test, after cooling to room temperature of about 75° F. under ambient conditions, had an average tensile strength of substantially 750 lbs. per square inch, while other shell molds, after having been subjected to a temperature of 50° C. in an atmosphere of 100 percent relative humidity for a period of fifteen hours,

---

[9] The Combustibility Index of a resole, as reported herein, is determined as follows : a thin film of a resole to be tested is spread on a platen, and the thin film is cured in an oven. The cured film is then stripped from the platen, ground and screened. Portions of the ground material which are minus 100 mesh, plus 200 mesh, U.S. Sieve Series, are collected as a test sample, and placed in a conditioned inverted cone made of 100 mesh, U.S. Sieve Series, nickel-copper alloy screen. For conditioning, the inverted cone is placed in a furnace, and thermocouples are positioned, a first within the cone, a second above the cone and a third below the cone. The furnace is then heated until all three thermocouples read 300° F., and the power input to the furnace is adjusted to maintain such temperature at equilibrium between the furnace and its surroundings ; the sample is then placed within the inverted cone, and, with the furnace power input the same, periodic checks are made until all three thermocouples again read substantially 300° F. The power input to the furnace is then approximately doubled, and necessary time and temperature readings are taken to enable the following determinations : (1) the temperature at which the first and second thermocouples indicate the same temperature ; (2) the temperature at which the first and third thermocouples indicate the same temperature ; and (3) the time in minutes between equal temperature readings on the first and second thermocouples and equal temperature readings on the first and third thermocouples. The Combustibility Index of the resin is :

$$\frac{(1)-(2)}{(3)}$$

Although it will be appreciated that the Combustibility Index has no theoretical significance, it has been found that there is a correlation between this index for a given resin and the resistance to punking of a vitreous fiber product with which the resin is used as a binder. In general, the lower the Combustibility Index of the binder resin, the higher is the resistance of the vitreous fiber product to punking. For example, the previously identified phenol-formaldehyde partial condensation products had a Combustibility Index of 17.

had an average tensile strength of substantially 410 lbs. per square inch.

Board-like products produced as described above in Example 3, using a binder composition produced as there described, except that a 7 gallon portion of the phenol-melamine-urea-formaldehyde dispersion produced as described in the first paragraph of this example was used instead of the 7-gallon portion of the phenol-melamine-formaldehyde dispersion, were indistinguishable with respect to punking resistance from those produced as described using the phenol-melamine-formaldehyde dispersion.

The procedure described in the first paragraph of this example has also been modified by reacting phenol and formaldehyde in the presence of barium hydroxide as described, for ten hours, cooling the resulting reaction mixture, neutralizing the cooled reacting mixture to a pH of approximately 7.5 with sulfuric acid, and then adding a 5.8 part charge of urea and a 17.4 part charge of melamine and concluding the reaction as described. The resulting reaction products had essentially the properties reported above, and, as a constituent of a hardened binder on glass fibers, had essentially the same properties as did the previously described compositions.

EXAMPLE 5

Phenol-urea-formaldehyde condensation products according to the invention were produced by the following procedure:

A reaction vessel was charged with 58 parts of phenol, 123.4 parts of formalin, and 12 parts of barium hydrate ($Ba(OH)_2 \cdot 8H_2O$), and the resulting charge was heated for a total of ten hours during which time it was stirred by a propeller-type agitator. The charge first was heated 110° F., and maintained at about such temperature for approximately three hours, heated to and held at approximately 120° F. for an additional five hours, and then heated to and held at about 140° F. for the remaining two hours, at which time the refractive index of the mixture was 1.4620, and infra-red absorption analysis indicated that it was substantially free of unreacted phenol and also of methylene groups. A 17 part charge of urea and a 2.5 part charge of urea sulfate, calculated as urea, were then added to the reaction products, and the resulting mixture was heated to and maintained at approximately 140° F. for an additional two hour period. The reaction products were then cooled to room temperature of approximately 75° F., and neutralized with sulfuric acid to a pH of about 7.2. Before the addition of the urea and urea sulfate, the reaction mixture was found to have a free formaldehyde content of approximately 3.7 percent. After addition of the urea and urea sulfate thereto, further reaction, and the final neutralization, the reaction products had a free formaldehyde content of approximately ½ percent. Substantially all of the barium hydroxide condensation catalyst was precipitated as barium sulfate, and the final product was substantially free of soluble ions, and had a dilutability of 700. The Combustibility Index of the phenol-urea-formaldehyde resole was found to be 12. Shell molds produced in connection with the shell mold test, after cooling to room temperature of about 75° F. under ambient conditions, had an average tensile strength of substantially 750 lbs. per square inch, while other shell molds, after having been subjected to a temperature of 50° C. in an atomsphere of 100 percent relative humidity for a period of fifteen hours, had an average tensile strength of substantially 410 pounds per square inch. The resin was found to have a Combustibility Index of 12.

Board-like products produced as described above in Example 3, using a binder composition produced as there described, except that a 7 gallon portion of the phenol-urea-formaldehyde dispersion produced as described in the first paragraph of this example was used instead of the 7 gallon portion of the phenol-melamine-formaldehyde dispersion, had a slightly lower punking resistance than did those produced as described in Example 3, but a significantly higher punking resistance than did such products made with the previously identified phenol-formaldehyde condensation products.

EXAMPLE 6

Phenol-dicyandimide-formaldehyde condensation proproducts according to the invention were produced by the following procedure:

A reaction vessel was charged with 80 parts of phenol, 123 parts of a 50 percent water solution of formaldehyde, 19.3 parts of water and 12 parts of barium hydrate ($Ba(OH)_2 \cdot 8H_2O$), and the resulting charge was heated for a total of seven hours during which time it was stirred by a propeller-type agitator. The charge first was heated to 110° F., and maintained at about such temperature for approximately two hours, and was then heated to and held at about 140° F. for the remaining five hours, at which time the refractive index of the reaction mixture was 1.4620, and infra red absorption analysis indicated that it was substantially free of unreacted phenol and also of methylene groups. The reaction products were then cooled to approximately 100° F., and neutralized with sulfuric acid to a pH of about 7.5. A 28 part charge of dicyandiamide was then added to the neutralized reaction products, and the resulting mixture was heated to and maintained at approximately 140° F. for an additional one hour period. The reaction products were then cooled to approximately room temperature of 75° F., and neutralized with further sulfuric acid to a pH of approximately 7.4. Before the first neutralization (of the phenol-formaldehyde condensation products, with sulfuric acid, and to a pH of about 7.5), the reaction mixture was found to have a free formaldehyde content of approximately 3.8 percent. After addition of dicyandiamide thereto, further reaction, and the final neutralization, the reaction products had a free formaldehyde content of approximately ½ percent. The Combustibility Index of the phenol-dicyandiamide-formaldehyde resole was found to be 12. Shell molds produced in connection with the Shell Mold Test, after cooling to room temperature of about 75° F. under ambient conditions, had an average tensile strength of substantially 750 lbs. per square inch, while other shell molds, after having been subjected to a temperature of 50° C. in an atmosphere of 100 percent relative humidity for a period of fifteen hours, had an average tensile strength of substantially 410 lbs. per square inch.

EXAMPLE 7

Phenol-thiourea-formaldehyde condensation products according to the invention were produced by the following procedure:

A reaction vessel was charged with 80 parts of phenol, 123 parts of a 50 percent water solution of formaldehyde, 19.3 parts of water and 12 parts of barium hydrate ($Ba(OH)_2 \cdot 8H_2O$), and the resulting charge was heated for a total of seven hours during which time it was stirred by a propeller-type agitator. The charge first was heated to 110° F., and maintained at about such temperature for approximately two hours, and was then heated to and held at about 140° F. for the remaining five hours, at which time the refractive index of the reaction mixture was 1.4620, and infra-red absorption analysis indicated that it was substantially free of unreacted phenol and also of methylene groups. The reaction products were then cooled to approximately 100° F., and neutralized with sulfuric acid to a pH of about 7.5. A 28 part charge of thiourea was then added to the neutralized reaction products, and the resulting mixture was heated to and maintained at approximately 140° F. for an additional one hour period. The reaction products were then cooled to approximately room temperature of 75° F., and neutralized with further sulfuric acid to a pH of approximately 7.4. Before the first neutralization (of the phenol-formaldehyde condensation products, with sulfuric acid, and to a pH of about 7.5), the reaction mixture was found to have a free formaldehyde content of approximately 3.8 percent. After addition of thiourea thereto, further reaction, and the final neutralization, the reaction products had a free formaldehyde content of approximately ½ percent. The Combustibility Index of the phenol-thiourea-formaldehyde resole was found to be 10. Shell molds produced in connection with the Shell Mold Test, after cooling to room temperature of about 75° F. under ambient conditions, had an average tensile strength of substantially 550 lbs. per square inch, while other shell molds, after having been subjected to a temperature of 50° C. in an atmosphere of 100 percent relative humidity for a period of fifteen hours, had an average tensile strength of substantially 250 lbs. per square inch.

It has been found that sulfonated alkyl diphenyl ethers when incorporated into the condensation products above described, produces a further advantage in that these ethers materially increase the dilutability of the resoles and also increase the strength of the cured binders. The sulfonated alkyl diphenyl ethers are most conveniently used as a salt of an alkyl diphenyl ether sulfuric acid, as for example the sodium or potassium salt; and because the sodium salt is the more readily available it is used in the following examples.

EXAMPLE 8

A reaction vessel was charged with 580 parts of 45 percent formalin, 327 parts of U.S.P. phenol, and 20 parts of barium monohydrate, and the resulting charge was constantly stirred by a propeller type agitator. The mixture was heated at 110° F. for 3 hours, at which time 9.8 parts of polyglycol (an inhibitor) and 1.6 parts of a sodium salt of an alkyl sulfonated diphenyl oxide having the following formula was added

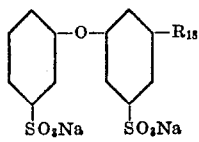

The temperature of the charge was then raised to 140° F. and cooked for 4 hours including the time to raise the temperature, and thereafter the temperature was raised to 160° F. and cooked for 1 hour and 10 minutes, including the time to raise the temperature. The charge was then cooled to 100° F. and was neutralized with 13 parts of commercial, concentrated sulfuric acid (properly diluted before adding to the charge) to neutralize the charge to a pH of 7.2. The resole had a dilutability of 2000% whereas a resole prepared in the same manner using the same ingredients, but without the use of the sulfonated alkyl diphenyl ether, had a dilutability of only 1200%.

A binder composition was prepared in the manner outlined in Example 1 using the resole of the preceding paragraph. Board-like products comprising the binder composition and glass fibers were prepared as outlined in Example 1, and it was found that, statistically, the board-like product had substantially the same physical properties, before and after weathering, as did the board-like product of Example 1.

EXAMPLE 9

A flame resistant board-like material was prepared in the same manner and using the same materials as outlined in the immediately above described example except that 52 parts of dicyandiamide were added after the mixture was cooked for 3 hours at 140° F. The batch was thereafter cooked for an additional hour at 140° F. before raising the temperature and cooking at 160° F. for 1 hour and 10 minutes. The resole had substantially the same properties as did the resole material of Example 8, except that it had a Combustibility Index of 14, whereas the resole material of Example 8 had a Combustibility Index of 17.

It has been found that the incorporation of a sulfonated alkyl diphenyl ether into a resole not only increases its dilutability, but also enters into the condensation reaction to increase the strength of the resite. The degree to which the dilutability of a resole is increased by the sulfonated alkyl diphenyl ether is generally proportional with the amount used for minor amounts of the ether. In general, 0.01% of the sulfonated alkyl diphenyl ether with respect to the reacted phenol-aldehyde solids of a resole will produce a noticeable increase in dilutability of the resole. No more than 1 to 2% would be used for economic reasons, and from 0.2 to 0.3% is the desired percentage range, with approximately 0.27% being the preferred amount.

It will be apparent that various changes and modifications can be made from the specific details disclosed herein without departing from the spirit and scope of the attached claims.

I claim:

1. In a method for producing a glass fiber thermal or acoustical insulating product which product comprises a plurality of intermeshed glass fibers bonded to one another at points of contact by a hardened resite binder and has an apparent density up to about 12 pounds per cubic foot, said method including the steps of projecting glass fibers and an associated hardenable phenolic binder composition onto a conveyor, and heating at least the binder to convert it to an infusible condition and to produce the thermal or acoustical insulating product, the improvement of using, as the binder, an aqueous dispersion comprising a water soluble resole produced by condensing formaldehyde and phenol in the presence of from 4 to 12 percent of barium hydroxide based on the total weight of phenol, wherein the mole ratio in which the formaldehyde is reacted with the phenol is from about 1¾:1 to about 2¾:1, and wherein the aqueous phase of the resole is from about 0.1 to about 3 normal with respect to dissolved barium ions, and converting the barium hydroxide to finely divided suspended barium sulfate particles by adding sulfuric acid to the dispersion in an amount at least substantially equivalent to the barium hydroxide and in a concentration such that the barium sulfate particles have an average size of from about 1 millimicron to about 1 micron, which particles are insoluble in water and inert with respect to the resole.

2. A method for producing a glass fiber thermal or acoustical insulating product which method comprises producing a dispersion of a resole and barium sulfate at a pH from 6 to 8 by adding to an aqueous dispersion of a water soluble resole produced by condensing formaldehyde and phenol in the presence of from 4 to 12 percent of barium hydroxide based on the total weight of phenol, wherein the mol ratio in which the formaldehyde is reacted with the phenol is from about 1¾:1 to about 2¾:1, and wherein the aqueous phase of the resole is from about 0.1 to about 3 normal with respect to dissolved barium ions, an amount of sulfuric acid at least substantially equivalent to the barium hydroxide, and in a concentration such that the barium sulfate is precipitated in a particle size ranging from about, millimicron to about 1 micron, spraying a binder comprising the resulting dispersion through a region while projecting glass fibers through the region, collecting the projected glass fibers and associated binder on a conveyor, and conveying the glass fibers and associated binder through a curing oven to convert the binder to an infusible condition with substantially all of the barium from the barium compound distributed therein as finely divided barium sulfate.

3. An article which is a glass fiber thermal or acoustical insulating product, said article having an apparent density up to about 12 pounds per cubic foot, and comprising a body of intermeshed glass fibers bonded to one another at points of contact by a resite formed by thermal cure of a binder associated with the glass fibers, and distributed throughout said body, said binder comprising a water soluble resole having finely divided barium sulfate particles suspended therein, said particles having an average size ranging from about 1 millimicron to about 1 micron, and being present in an amount equivalent to from 4 to 12 percent of barium hydroxide based on the total weight of phenol charged to produce the resole by condensation, said resole being one wherein the mole ratio in which the formaldehyde is reacted with the phenol is from about 1¾:1 to about 2¾:1, whereby said barium sulfate particles are distributed throughout the resite binder in the thermal or acoustical insulating product.

References Cited

UNITED STATES PATENTS

| | | | |
|---|---|---|---|
| 3,004,941 | 10/1961 | Mestoagh | 117—126 |
| 2,395,676 | 2/1946 | Luth | 260—57 |
| 1,111,288 | 9/1914 | Aylsworth | 260—60 |
| 1,146,300 | 7/1915 | Alysworth | 260—60 |

WILLIAM A. POWELL, Primary Examiner

J. J. BELL, Assistant Examiner

U.S. Cl. X.R.

117—126; 156—62.2, 335; 161—158, 170